United States Patent [19]

Sato

[11] Patent Number: 4,539,700

[45] Date of Patent: Sep. 3, 1985

[54] PERSONAL PORTABLE AUDIO DEVICE

[75] Inventor: Masanobu Sato, Tokyo, Japan

[73] Assignee: Olympus Optical Company Limited, Tokyo, Japan

[21] Appl. No.: 596,570

[22] Filed: Apr. 4, 1984

Related U.S. Application Data

[63] Continuation of Ser. No. 511,718, Jul. 7, 1983, abandoned, which is a continuation of Ser. No. 210,292, Nov. 25, 1980, abandoned.

[30] Foreign Application Priority Data

Nov. 26, 1979 [JP] Japan .................................. 54-16351
Nov. 26, 1979 [JP] Japan ................................ 54-163532

[51] Int. Cl.³ .......................... H04B 1/00; H04M 1/04
[52] U.S. Cl. ....................................................... 381/90
[58] Field of Search ............................ 179/157, 156 R; 455/100, 89, 343, 349, 351; 381/90

[56] References Cited

U.S. PATENT DOCUMENTS

| | | | |
|---|---|---|---|
| 2,156,504 | 5/1939 | Liss | 179/157 X |
| 2,285,083 | 6/1942 | Cover, Sr. | 455/100 X |
| 2,935,606 | 5/1960 | Harrison et al. | 455/89 |
| 3,728,664 | 4/1973 | Hurst | 455/89 X |
| 3,844,840 | 10/1974 | Bender | 179/107 R X |
| 3,868,573 | 2/1975 | Holcomb et al. | 179/157 X |
| 4,070,553 | 1/1978 | Hass | 179/157 |
| 4,109,105 | 8/1978 | Von Statten, Jr. | 179/1 VE |

FOREIGN PATENT DOCUMENTS

| | | | |
|---|---|---|---|
| 2707793 | 9/1977 | Fed. Rep. of Germany | 455/100 |

*Primary Examiner*—Thomas W. Brown
*Attorney, Agent, or Firm*—Toren, McGeady, Stanger, Goldberg & Kiel

[57] ABSTRACT

A personal portable audio device includes a garment having a pocket, a speaker is provided at the shoulder portions of the garment, audio components located in the garment pockets, and lead wires are arranged in the garment for connecting the audio components with the speakers.

3 Claims, 4 Drawing Figures

PERSONAL PORTABLE AUDIO DEVICE

This is a continuation of application Ser. No. 511,718, filed July 7, 1983, abandoned, which in turn was a continuation of application Ser. No. 210,292, filed Nov. 25, 1980, abandoned.

BACKGROUND OF THE INVENTION

The present invention relate to a personal portable audio device used by assembling an audio system in a garmet.

As a personal portable audio system, hitherto, speakers were provided in a muffler-like support member so as to enjoy audio listening personally.

This support member, however, is muffler-like, so that when used, the whole weight of the audio system falls on the rear portion of the neck, causing pain when used for a long period. Moreover, audio components for speakers should be connected by separate means, which is troublesome, and these audio components and speakers are connected by a connecting cord, so that when a listener moves, the cord becomes an obstacle or is liable to catch on something.

Moreover, in order to provide a larger output capacity for the audio components, if a separate power source is employed, such as a dry cell, then the power source is bulky. A separate heavy cell is very disadvantageous for use out-of-doors.

SUMMARY OF THE INVENTION

An object of the present invention is to eliminate the above described disadvantages of the conventional device.

Another object of the present invention is to provide a personal portable audio device by providing speakers in shoulder portions of a garment, placing audio components in pocket portions, and connecting these speakers and audio components by lead wires, so that the wearer of the garment can enjoy audio listening under pleasant conditions for a long time.

A further object of the present invention is to provide a personal portable audio device by providing speakers and audio components in a garment, connecting these components by lead wires arranged in the garment, and assembling solar cells as a power source of the audio components, thereby enjoying audio sound under pleasant conditions for a long time, with an easy to carry device.

According to the present invention there is provided a personal portable audio device comprising a garment with two shoulder portions and having a pocket, a speaker provided at each shoulder portion of the garment, audio components placed in the pocket, and lead wires arranged in the garment for connecting the audio components with the speakers. In the front, the garment has pockets on both sides and one pocket is equipped with the audio components and the other pocket is equipped with an accessory inclusive of at least a power source. The pocket for carrying the audio components is provided with a base member for connecting the audio components by a docking means. Hooks on the garment are utilized for electrically connecting the audio components with the power source. The base member is provided with external output terminals. The lead wires for connecting the audio components with the speakers are arranged between the cloth and lining of the garment.

According to the present invention there is provided a personal portable audio device comprising a garment having a pocket, a speaker provided at a shoulder portion of the garment, audio components equipped in the pocket, lead wires arranged in the garment for connecting the audio components with the speaker, and solar cells provided in the garment for supplying power to the audio components.

DESCRIPTION OF THE PREFERRED EMBODIMENT

Figure 1:
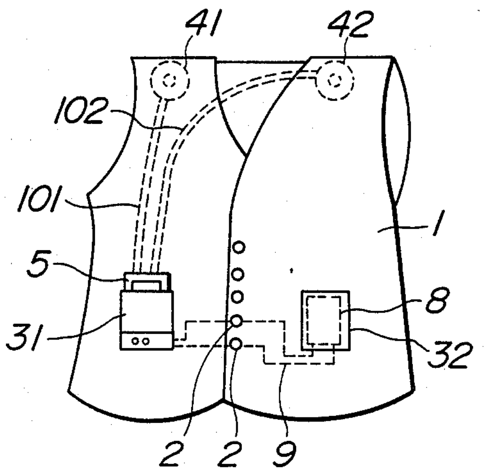
FIG. 1 is a schematic elevation showing one embodiment of a personal portable audio device according to the present invention.

Referring now to the drawings, wherein the same reference characters designate the same or corresponding parts throughout the several views, FIG. 1 shows an embodiment of a personal portable audio device according to the present invention, positioned in a vest. In FIG. 1, reference numeral 1 is a vest or garment, and the vest 1 opens in the front and the front of the garment is hooked or buttoned using metallic engaging members, for example, hooks 2. This vest 1 is also provided with pockets 31, 32 on both sides of the front.

Figure 2:
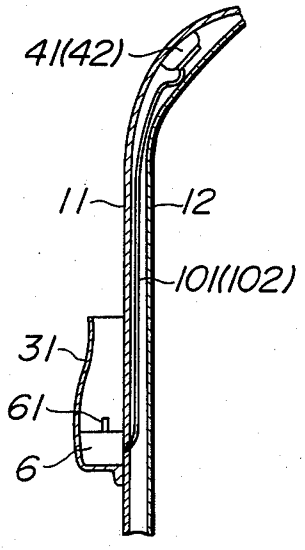
FIG. 2 is a cross-sectional view showing an essential part of the audio device shown in FIG. 1.

To both shoulder portions of the vest 1 are fixed speakers 41, 42, respectively. In this case, the speakers 41, 42 are positioned for transmitting sound to a listener who wears the vest 1. Moreover, these speakers 41, 42, as shown in FIG. 2, are positioned in the vest, for example, between a surface cloth 11 and a lining 12 so that the speakers cannot be seen on the outside of the vest.

Figure 3:
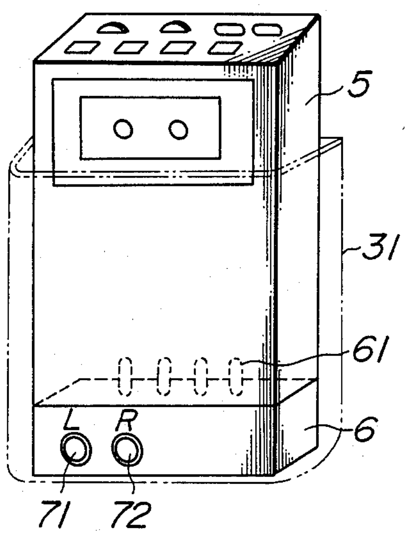
FIG. 3 is a schematic diagram showing a pocket equipped with audio components used in the device shown in FIG. 1.

Audio components, for example, such as a tape recorder 5, are accommodated in the pocket 31. In this case, the pocket 31, as shown in FIG. 3, is provided with a base member 6 having a docking terminal 61 therein. The tape recorder 5 is docked with the base member 6. The tape recorder 5 can be operated on the upper surface thereof, and a cassette exchange can be made by opening the upper portion with the use of a kangaroo typepocket. The base can also be provided with external output terminals 71, 72, note FIG. 3.

The pocket 32, on the other hand, is equipped with accessory components 8 including a power source of the cell type, an amplifier and the like. The accessory components 8 are connected to the base member 6 through the hooks 2 by lead wires 9, and when the vest 1 is worn and the hooks 2 are hooked, the power source is switched on and connected to the side of the tape recorder 5. In this case, the lead wires 9 are arranged in the inside of the vest 1, for example, between the surface cloth and the lining thereof. Moreover, the base member 6 and each speaker 41, 42 are connected therebetween by respective lead wires 101, 102. These lead wires 101, 102, as shown in FIG. 2, are also arranged in the inside of the vest 1, for example between the surface cloth 11 and the lining 12 thereof.

According to the above arrangement, when a listener puts on the vest 1 and hooks the hooks 2, the accessory components 8 are connected to the base member 6 through the lead wires 9 and the power source is switched on. When the tape recorder 5 is operated in this condition, a sound source signal is supplied to the speakers 41, 42 through the lead wires 101, 102. Thus, the listener can personally enjoy audio sound from the speakers 41, 42 provided on both shoulder portions. In this case, the wearing of the vest 1 disperses the whole weight of the device to both shoulder portions, so that audio sound can be enjoyed in a pleasant state for a long time as compared with the conventional muffler-type system which concentrates the whole weight of the system on the rear portion of the listener's neck. Moreover, both pockets 31, 32 of the vest 1 can accommodate the tape recorder 5 and the accessory device 8 therein respectively, by taking both balances into consideration, so that even when enjoying audio sound during walking, a pleasant state can be obtained without any resistance. Moreover, the lead wires 101, 102 connected to each speaker 41, 42 are arranged in the vest 1, so that such wiring is not an obstacle and thus the wiring is not accidentally cut off. In addition, as a power source switch between the power source in the accessory components 8 and the tape recorder 5, the hooks 2 are utilized, so that the lead wires 9 between the power source and the tape recorder 5 can be made shortest, and thus power source is not switched on except when the vest is worn and the hooks engaged, so that the power source of the cell type is effectively prolonged in life. Moreover, the base member 6 for docking the tape recorder 5 is provided with external output terminals 71, 72, so that it is possible to connect to the other speaker, for example, the audio device is connected to an audio system provided in a vehicle and more effective audio sound can be enjoyed.

Figure 4:
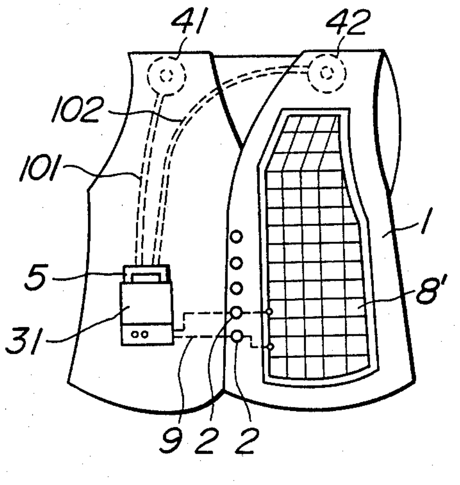
FIG. 4 is a schematic elevation showing another embodiment of a personal portable audio device according to present invention.

FIG. 4 shows another embodiment of a personal portable audio device according to the present invention. In FIG. 4 the same reference numerals designate the same elements as in FIG. 1 so that detailed explanations thereof are omitted.

The construction of the audio device in this embodiment is the same as that shown in FIG. 1 except for the provision of a solar cell as a power supply source on the right side front of the vest 1, so that the detailed explanation of the portion is omitted. That is, the vest 1 is provided with only one pocket 31 on the left side front body thereof and a solar cell 8′ as a power supply source is provided on the surface portion of the right side front of the vest 1. This solar cell 8′ is arranged and the whole surface of the front right side of the vest 1 and is connected to the base member 6 by means of the lead wires 9 through the hooks 2 as in the first embodiment shown in FIG. 1.

According to the above arrangement, in addition to the above described advantages, the tape recorder 5 and the solar cell 8′ are provided on both sides of the vest 1 by taking both balances into consideration, so that even while enjoying audio sound during walking, a pleasant condition can be obtained without any resistance.

Moreover, since a solar cell is used, it is possible to enjoy audio sound particularly in the out of doors for a long time, and the audio device is remarkably effective as a portable one as compared with an audio device using a conventional dry cell.

The present invention is not limited to the above embodiment, but can be modified without departing from the essential features of the invention. For example, in the above embodiment, the speakers 41, 42 are provided on both shoulder portions of the vest 1, but can be provided on one shoulder portion. Moreover, in the above embodiment, the hook 2 is used as a switch for the power supply source, but instead of the hook 2, a common button can be used. In this case, the wiring between the power supply source 8 or solar cell 8′ and the base member 6 can be passed through a portion of the vest 1. Moreover, in the above embodiment, one pocket 31 is equipped with the tape recorder 5 and the other pocket 32 is equipped with accessory components such as a power supply source or the like, but the other pocket 32 can be omitted, and the side containing the base member 6 or the tape recorder 5 in the pocket 31 may be integrally provided with a power supply source.

In the above embodiment, the solar cell 8′ is provided in front of the vest 1, but can be provided at the back portion or any other portion. Moreover, in the above embodiment, the tape recorder 5 is described as audio components, but any other audio components such as a radio or the like can be used. In the above embodiment, a vest is used consistently, but any other garments can be utilized.

As described above, the present invention can provide a personal portable audio device by providing a speaker and audio components in garments, by connecting these devices with lead wires arranged in the garments, and assembling a solar cell as a power supply source of the audio components, thereby enjoying audio sound under the pleasant condition for a long time, and providing excellent portability.

What is claimed is:

1. A personal portable audio device comprising a vest-like sleeveless outer garment arranged to be worn by a wearer, said vest-like sleeveless outer garment comprising a back part and a front part connected to said back part, said front part comprising a first front part section and a second front part section, each said first and second front part section having a free edge extending upwardly when said garment is worn by the wearer, means on said first and second front part sections for selectively joining said first and second front parts sections together along said free edges so that said front part can be worn in the open condition or in the closed condition, each of said first and second front part sections having a pocket therein and a shoulder portion spaced upwardly from said pocket when said garment is worn by the wearer, said garment being formed by a surface cloth facing outwardly and a lining located opposite said surface cloth and facing inwardly when said garment is worn, said surface cloth and lining defining a space therebetween, a speaker mounted on each said shoulder portion of said front part of said garment with said speakers being located between said surface cloth and lining whereby said speakers are not visible on the exterior of said garment, said pockets being open on the exterior of said garment, audio components positioned in at least one of said pockets, a power source located within said garment, said power source located in one of said first and second front part sections and said audio components located in the other one of said first and second front part sections, first lead wires located between said surface cloth and lining within the garment and connecting said audio components with said speakers, second lead wires located between said surface cloth and lining for selectively connecting said audio components and power source whereby said first and second lead wires are not exposed on the exterior of said garment, said second lead wires being located in said first and second front part sections so that when said first and second front part sections are in the open condition said second lead wires are disconnected and said power source is not connected to said audio components, and said means for joining said first and second front part sections together being arranged with said means connected to said second lead wires so that said second lead wires in said first and second front part sections are interconnected for placing said audio components in connection with said power source when said first and second front parts are in the closed condition, said means comprising hooks secured on said first and second front part sections along said free edges thereof for securing said first and second front part sections in the closed condition, and said hooks being connected to said second lead wires for interconnecting said second lead wires in said first and second front part sections.

2. A personal portable audio device, as set forth in claim 1, wherein a base member is located in said pocket containing said audio components and said base member includes a docking means for connecting said audio components.

3. A personal portable audio device comprising a vest-like sleeveless outer garment arranged to be worn by a wearer, said vest-like sleeveless outer garment comprising a back part and a front part connected to said back part, said front part comprising a first front part section and a second front part section, each said first and second front part section having a free edge extending upwardly when said garment is worn by the wearer, means on said first and second front part sections for selectively joining said first and second front part sections together along said free edges so that said front part can be worn in the open condition or in the closed condition, said first front part section having a pocket therein and each of said first and second front part sections having a shoulder portion located upwardly from said pocket when said garment is worn by the wearer, said garment being formed by a surface cloth facing outwardly and a lining located opposite said surface cloth and facing inwardly when said garment is worn, said surface cloth and lining defining a space therebetween, a speaker mounted on each said shoulder portion of said front part of said garment with said speakers being located between said surface cloth and lining whereby said speakers are not visible on the exterior of said garment, said pocket being open on the exterior of said garment, audio components positioned within said pocket, a solar power source located within said garment, said solar power source located in said second front part section and said audio components located in said pocket in said first front part section, first lead wires located between said surface cloth and lining within said garment and connecting said audio components with said speakers, second lead wires located between said surface cloth and lining for selectively connecting said audio components and solar power source whereby said first and second lead wires are not exposed on the exterior of said garment, said second lead wires being located in said first and second front part sections so that when said first and second front part sections are in the open condition said second lead wires are disconnected and said power source is not connected to said audio components, and said means for joining said first and second front part sections together being arranged with said means connected to said second lead wires so that said second lead wires in said first and second front part sections are interconnected for placing said audio components in connection with said solar power source when said first and second front parts are in the closed condition, said means comprising hooks secured on said first and second front part sections along said free edges thereof for securing said first and second front part sections in the closed condition and said hooks being connected to said second lead wires for interconnecting said second lead wires in said first and second front part sections.

* * * * *